J. E. COCHRAN.
COMPUTING SCALE DIAL.
APPLICATION FILED AUG. 26, 1907.
956,682.
Patented May 3, 1910.
*Fig. 2.*
*Fig. 1.*
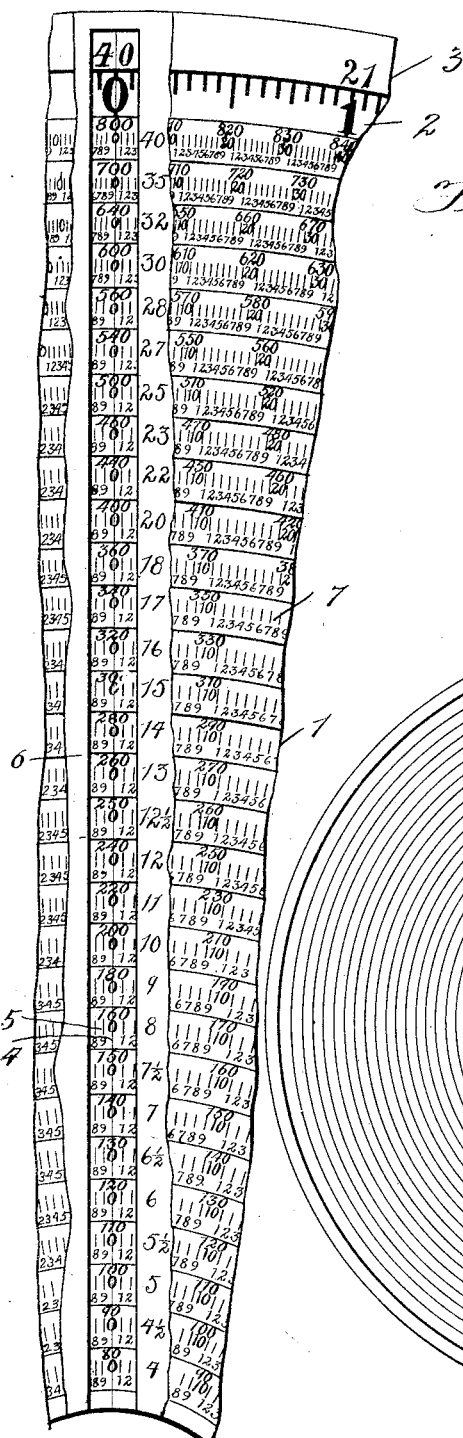
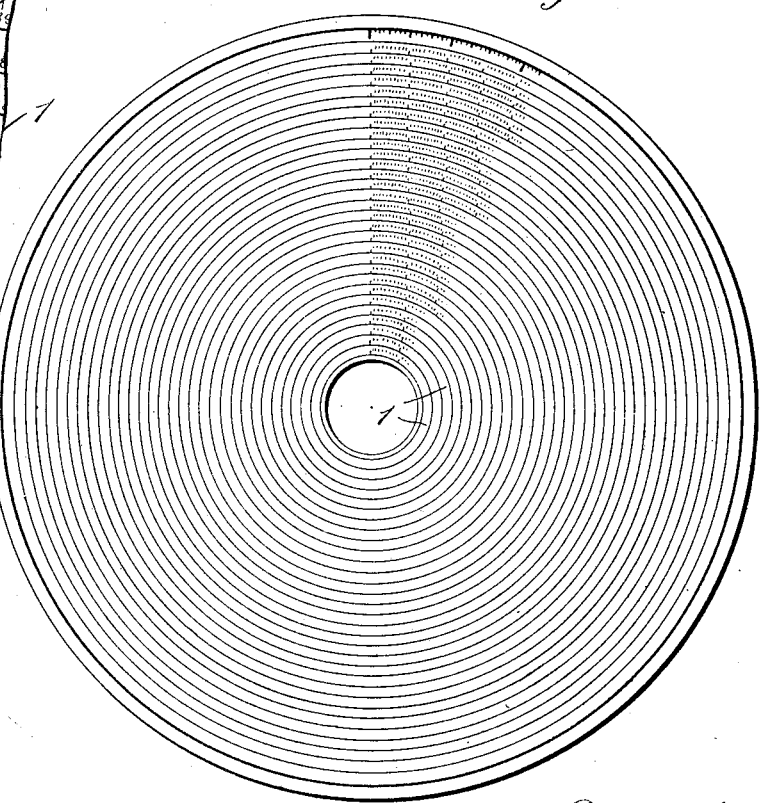
Witnesses:
Inventor:
Joseph E. Cochran
by Brown & Hopkins
Attorneys

UNITED STATES PATENT OFFICE.

JOSEPH E. COCHRAN, OF ELKHART, INDIANA.

COMPUTING-SCALE DIAL.

956,682.

Specification of Letters Patent.

Patented May 3, 1910.

Application filed August 26, 1907. Serial No. 390,148.

*To all whom it may concern:*

Be it known that I, JOSEPH E. COCHRAN, a citizen of the United States, residing at Elkhart, in the county of Elkhart and State of Indiana, have invented certain new and useful Improvements in Computing - Scale Dials, of which the following is a full, clear, and exact specification.

This invention relates to that class of scale dials used on computing weighing scales, and indicates both the weight and the amount to be charged for that weight at a given price per pound or fraction thereof, the price per pound being usually indicated on a pointer or index arranged in a position radial with respect to the dial, and the amounts on the dial being indicated by parallel lines registering with the prices on the pointer or index, which is usually fixed while the dial rotates. For the sake of compactness and keeping the dimensions of scale dials of this character within feasible bounds, it has been customary to indicate in full, by means of figures, no amounts less than five cents, and of the amounts over ten cents, only those constituting a multiple of ten, the intermediate amounts being indicated heretofore by means of graduations without figures, because it is not feasible to number these and to also have in the same lateral row from two to five figures necessary for denoting the successive multiples of ten, it being obvious that the figures of the latter, or else the figures of the intermediate amounts would be so minute as to be illegible. Consequently, with computing scale dials having any considerable range of prices and weights, it has heretofore been necessary to observe the position of the index or pointer very closely and to count the intermediate graduations in order to determine the exact amount indicated. This difficulty in reading the dial leads to carelessness and mistake, with an attendant loss to either the vendor or the vendee. These difficulties are of course very greatly multiplied or increased on dials that are designed to make two revolutions, because with such it becomes not only necessary to duplicate the weight line of graduations, but to employ an extra line of graduations for each price.

To accomplish this within substantially the same dimensions as heretofore employed on ordinary computing scale dials, and at the same time have substantially all of the graduations numbered, is the primary object of the present invention.

With a view to the attainment of these ends and the accomplishment of other objects, which will hereinafter appear, the invention consists in the features of novelty which will now be described with reference to the accompanying drawings, and more particularly pointed out in the claims.

In the said drawings—Figure 1 is a face view of a computing scale dial having the rows of graduations which indicate the amounts arranged concentrically, but in this small view it has not been feasible to indicate by figures what the graduations stand for; Fig. 2 is an enlarged segment of the dial, shown in Fig. 1, and also illustrating the index or pointer.

In this exemplification of the invention the dial is represented with its graduations indicating the amounts in money arranged in concentric circles 1, or in the spaces between such circles, while the graduations indicating the weights are shown in two marginal rows or circular spaces 2, 3. The index or pointer in this illustration is indicated by a line 4, which is arranged in radial relation to the dial, and which may be constituted by a wire or cord, or by a line cut or formed directly upon the glass or transparent member 5 set in the casing 6 which incloses the dial, at the edge of which glass or transparent member the price per pound or fraction thereof is indicated as shown in Fig. 2. In this example of the invention, these prices range from four cents to forty cents, but the particular amounts are of course immaterial and may be varied without departing from the principles of the invention. The first line of graduations 2 indicating the weight are spaced to indicate a weight ranging from one pound and fractions thereof to twenty pounds, making one complete revolution of the dial, and naught which appears in this row of graduations standing at once for zero and the second character of the maximum weight in that row, while the outer row of graduations 3 represent weight from twenty pounds to forty pounds and are read with reference to the second revolution of the dial. In the first or inner row 2 every fifth graduation may be numbered, the intermediate graduations representing ounces, and these graduations of course are or may be read with respect to the outer row 3 during the second revolution of the dial.

In each of the spaces 1 provided for the amounts in money is arranged a row of graduations 7 arranged equal distances apart and preferably midway between the concentric lines which constitute these spaces 1. These graduations represent cents, and they are numbered consecutively in accordance with the United States system of currency from 1 to 9 in consecutive series, with every tenth one numbered either 10 or a multiple of 10, such multiples of 10 increasing by ten at each tenth graduation.

The numerals 1 to 9 on the intermediate graduations 7 are comparatively smaller and placed directly below the graduations to which they refer, while the number of every tenth graduation is comparatively large and is placed above or outside of the concentric row of numerals 1 to 9. These graduations 7, the numerals 1 to 9, and the numerals which stand for ten cents and the multiples of ten cents before described, are read with reference to the prices on the index or adjacent to the index during the first revolution of the dial, and it will be seen that with this construction and arrangement the exact amount in dollars and cents may be instantly determined by observing the particular graduation with which the price and the index line 4 register, without the necessity of counting the number of graduations between the amount indicated in full and the index line and adding this number and the amount indicated in full, as heretofore.

Adjacent to and preferably immediately above the full numbers representing 10 and multiples of 10 before described as being arranged in line with the graduation 7, are indicated in full numbers, and preferably in comparatively large figures, the multiples of 10 which would be produced by multiplying the weight indicated during the second revolution of the dial by the price indicated on or adjacent to the index, and while these amounts are not provided with a separate row of figures or a separate row of graduations to indicate the pennies, it will nevertheless be seen that the same row of graduations 7 and the same concentric series of numerals 1 to 9 apply equally to the second revolution amounts and may be read in reference thereto with the same facility as they may be read with reference to the first revolution amounts, thus making the same set of penny numbers and penny graduations serve for the two sets of amounts belonging to the first and second revolutions respectively whereby the capacity of the dial is doubled without materially increasing its diameter.

Having thus described my invention, what I claim as new and desire to secure by Letters Patent, is:—

1. As a new and useful article of manufacture a computing scale having a plurality of concentric rows of graduations, all of said graduations excepting every tenth one being numbered in consecutive series from one to nine and every tenth one bearing a number constituting a multiple of ten, and the numbers comprising the second set being set off from said numbers one to nine so as to be out of the line thereof, and a third series of numbers larger than the second said numbers arranged in a line concentric with the first said numbers, each of the third said numbers being arranged adjacent one of the second said numbers but set off therefrom and from the first said series in a different concentric line.

2. As a new and useful article of manufacture a computing scale dial having a plurality of concentric rows of graduations, all of said graduations excepting every tenth one being numbered in consecutive series from one to nine, said tenth graduation bearing a number constituting a multiple of ten arranged in a row concentric with and set off from the first said series of numbers, and a third series of numbers arranged respectively adjacent the second said numbers greater in amount than the second said numbers adjacent to which they are respectively located, the second said numbers being arranged in the same concentric line as the said graduations and the third series of numbers being arranged at one side and the first said series of numbers at the other side of said row of graduations.

3. As a new and useful article of manufacture a computing scale dial having a plurality of concentric rows of graduations, all of said graduations excepting every tenth one being numbered in consecutive series from one to nine and said numbers being located in a row at one side of the row of graduations and parallel therewith, every tenth graduation being numbered by a number constituting a multiple of ten and the latter said numbers being arranged at the opposite side of the said row of graduations and in a line concentric therewith, and a third set of numbers each constituting a multiple of ten arranged one on every tenth graduation at a position between the first and second said numbers and offset with respect to the other two sets of numbers.

4. As a new and useful article of manufacture a computing scale dial having a plurality of concentric lines forming concentric spaces, a row of graduations indicated parallel with said lines in each of said spaces, all of said graduations in each row being numbered in consecutive series from one to nine and said numbers being arranged in a concentric row in each of said spaces between said row of graduations and one of the concentric lines contiguous thereto, every tenth graduation in each of said spaces bearing a number constituting a multiple of ten arranged in a line concentric with said row of graduations and within each of said spaces but between the row of graduations and the one of the said concentric lines on the side of the said graduations opposite to that on which the first said numbers indicating said graduations are located and every tenth graduation also bearing a third number constituting ten or a multiple of ten arranged directly in line with the said row of graduations.

5. As a new and useful article of manufacture a computing scale dial having a plurality of concentric rows of graduations indicating money, all of said graduations excepting every tenth one being numbered in consecutive series from one to nine and every tenth one bearing two separate numbers indicating two separate amounts, each of the latter said numbers being equal to ten or a multiple of ten and being offset in different concentric rows from the first said series of numbers, a marginal row of graduations on the dial spaced to indicate weight, and two separate numbers of different values arranged at every whole pound one of the said weight graduations and representing respectively a whole pound and a plurality of whole pounds.

6. As a new and useful article of manufacture, a computing scale dial having a plurality of concentric lines forming concentric spaces, a row of graduations parallel with said lines and in each of said spaces and spaced from the concentric lines, said graduations being arranged in series of nine, spaced from each other, and each series being numbered consecutively from 1 to 9, the said numbers being arranged in the space on one side of the graduations and between said graduations and one of the concentric lines, the space between the indication numbered 9 of one series and the indication numbered 1 of the next series being equal to the space between two of the graduations in any series, the spaces between the series being provided with a number indicating the tenth graduation, said number being arranged in line with the series of graduations and offset with respect to the indicating characters of said series of graduations and a third series of numbers arranged in the space between the series of graduations and one of the concentric lines and on the side of the said series opposite to that on which the indicating numbers of the said series are arranged, the last series of numbers being multiples of 10 and being arranged directly above the respective numbers indicating the tenth graduations.

In testimony whereof I have signed my name to this specification, in the presence of two subscribing witnesses, on this 22nd day of August A. D. 1907.

JOSEPH E. COCHRAN.

Witnesses:
RUFUS R. BEARDSLEY,
MARGARET T. DARLING.